United States Patent [19]

Hosoya et al.

[11] Patent Number: 4,741,295
[45] Date of Patent: May 3, 1988

[54] INTAKE MANIFOLD SYSTEM FOR V-TYPE MULTIPLE CYLINDER INTERNAL COMBUSTION ENGINE

[75] Inventors: Hideaki Hosoya; Shigeru Suzuki; Akihisa Senga; Shoichi Ohtaka; Yukio Kondo; Kaoru Aoki; Tadashi Hashimoto; Yasuo Kitami, all of Wako, Japan

[73] Assignee: Honda Giken Kogyo Kabushiki Kaisha, Japan

[21] Appl. No.: 904,338

[22] Filed: Sep. 5, 1986

[30] Foreign Application Priority Data

Sep. 9, 1985 [JP] Japan ............................. 60-199072
Oct. 17, 1985 [JP] Japan ......................... 60-159105[U]

[51] Int. Cl.⁴ ............................................. F02B 75/18
[52] U.S. Cl. ............................. 123/52 MV; 123/568
[58] Field of Search ......... 123/52 MV, 52 MC, 52 MB, 123/52 M, 568

[56] References Cited

U.S. PATENT DOCUMENTS

| | | | |
|---|---|---|---|
| 2,845,911 | 8/1958 | Gill | 123/52 MV |
| 2,927,564 | 3/1960 | Turlay et al. | 123/52 MV |
| 3,742,923 | 7/1973 | Oblander et al. | 123/52 MV |
| 4,068,637 | 1/1978 | Takamiya | 123/52 M |
| 4,367,719 | 1/1983 | Kimura et al. | 123/568 |
| 4,440,120 | 4/1984 | Butler | 123/52 MV |
| 4,513,698 | 4/1985 | Senga et al. | 123/52 MV |
| 4,545,331 | 10/1985 | Ito et al. | 123/52 M |
| 4,615,324 | 10/1986 | Choushi et al. | 123/52 MV |
| 4,643,137 | 2/1987 | Choushi et al. | 123/52 MV |

Primary Examiner—Charles J. Myhre
Assistant Examiner—David A. Okonsky
Attorney, Agent, or Firm—Steele, Gould & Fried

[57] ABSTRACT

An intake manifold system for a V-type multiple cylinder engine comprising an upstream intake passage, a plenum intake chamber, an intake manifold and downstream intake passages. The upstream intake passage which is directly connected to a throttle body curves downwards towards the intake chamber while the downstream intake passages are connected to the upper end of the intake chamber by way of the intake manifold and after being curved in the shape of inverted letter U are connected to the intake ports of the engine. The intake manifold system as a whole can be accommodated within a gap defined between the two cylinder banks of the engine in a highly compact manner. The advantageous arrangement of the overall intake passage produces favorable ram effect and assures high volume efficiency particularly in low speed range of the engine.

7 Claims, 4 Drawing Sheets

INTAKE MANIFOLD SYSTEM FOR V-TYPE MULTIPLE CYLINDER INTERNAL COMBUSTION ENGINE

TECHNICAL FIELD

This invention relates to an intake manifold system for a V-type multiple cylinder engine and in particular to such an intake manifold system which allows improvement of the performance of the engine and reduction of the external dimensions of the engine at the same time.

PRIOR ART

It has been generally known that the intake manifold system of an engine is required to have a certain intake passage length so that the breathing properties of the engine may be optimized according to resonator concepts. Optimum configurations of such ram tube arrangements can be determined by experiments but in reality the length of the intake passages is limited by the space permitted to the intake manifold system and the performance of the engine must be compromised in most cases.

U.S. Pat. No. 4,440,120 discloses a manifold structure for a V-type multiple cylinder engine in which an intake manifold is arranged between the two banks of engine cylinders and the required passage length is obtained by interdigitally coiling ram intake passages around the periphery of a casing which is accommodated in the space defined by the two cylinder banks. The interior of the casing surrounded by the coiling intake passages is defined as an intake plenum chamber which extends along the axial direction of the V-type multiple cylinder engine. A carburetor or a throttle body is mounted to an axial end of the plenum chamber.

However, if the engine is water cooled which is often the case with a V-type multiple cylinder engine, since a connecting pipe for conducting cooling water is typically passed across the gap between the cylinder banks of the V-type engine along the axial direction and the interference with such an accessory member of the engine must be avoided, it has been difficult to secure a sufficient passage length for the intake passages and to arrange a carburetor or a throttle body in an advantageous location. In the above mentioned U.S. patent, such a cooling water passage is defined in the lower part of the intake manifold casing and it appears that heat transmission from the cooling water to the intake air/fuel mixture can not be appropriately controlled.

U.S. Pat. No. 3,742,923 discloses an intake manifold system for a V-type engine which defines a clearance between the lower surface of the intake manifold and the upper surface of the engine between the two cylinder banks. However, the overall length of the intake passage is limited.

A modern automotive engine is commonly provided with an EGR device to recycle part of the exhaust gas (EGR gas) by an appropriate amount into the intake air for the purpose of lowering the temperature of combustion and reducing the emission of Nox. In designing an intake manifold system, it is quite essential to provide an EGR supply port in an advantageous location in the intake manifold so as to accomplish uniform distribution of the EGR gas. Uniform distribution of the EGR gas to each cylinder is necessary for producing a uniform combustion pressure in each cylinder and is therefore essential for high performance and smooth operation of the engine.

Also, lead oxide or the like contained in the exhaust gas should not contaminate the throttle valve and the surrounding wall surfaces by adhering thereto because it could cause sticking of the throttle valve. An EGR gas supply port is typically provided downstream of a throttle valve but depending on the operating condition of the engine the intake air may be blown back to the throttle valve and may carry some of the EGR gas therewith. It is particularly a problem with a throttle body having a primary and a secondary throttle valve therein in a parallel relationship when the rotational speed of the engine is low and the engine load is light with only the primary throttle valve being opened because a strong negative pressure is produced in the vicinity of the secondary throttle valve.

Another problem that needs to be considered in designing an intake manifold system is the possibility of moisture accumulation within the intake manifold. This is particularly a problem when an EGR system is incorporated in the engine because the exhaust gas contains various chemical substances which turn into acid when dissolved into water as well as a high level of water vapor and the walls of the intake manifold which may be made of aluminum alloy could be rapidly corroded by such substances. Also, freezing of moisture within the intake manifold can be a problem because it will not melt away for a fairly long time after the engine is started and may partially block the intake passages for a long time thereby causing severe loss of engine power.

Yet another problem that needs to be considered in designing an intake manifold is the rigidity of the overall intake manifold system since the intake manifold system may serve as a resonator due to lack of rigidity and, as a result, may produce engine noises.

Brief Summary of the Invention

In view of such problems of the prior art, a primary object of the present invention is to provide an intake manifold system for a V-type multiple cylinder engine which allows a necessary intake passage length without increasing the external dimensions of the engine and without interfering with the members which are accessory to the engine.

Another object of the present invention is to provide an intake manifold system which incorporates an EGR system in an advantageous manner.

Yet another object of the present invention is to provide an intake manifold system which can effectively prevent accumulation of moisture therein.

Yet another object of the present invention is to provide an intake manifold system which is highly rigid and therefore can contribute to quiet operation of the engine.

According to the present invention, such objects are accomplished by providing an intake manifold system, comprising an upstream intake passage communicating with a main throttle valve located upstream thereof, an intake chamber communicating with the downstream end of the upstream intake passage, an intake manifold communicating with the downstream end of the intake chamber, and a plurality of downstream intake passages which are connected between the downstream ends of the intake manifold and intake ports of the engine in communication therewith, in a gap defined between two cylinder banks of a V-type multiple cylinder engine, wherein: the intake chamber extends along the direction of the crank shaft of the engine as a hollow chamber which is integrally formed with the intake manifold, and the upstream intake passage, which is connected between the throttle body and the intake chamber, inclines upward from its intake chamber end to its throttle body end.

Thus, a sufficient passage length can be provided to the upstream intake passage between the throttle valve and the intake chamber because the upstream intake passage extends obliquely relative to the horizontal line.

According to a certain aspect of the present invention, the intake manifold system comprises a first part having the downstream intake passages integrally therewith and a second part having the intake chamber and the upstream intake passage integrally therewith and depending from the first part. Thus, it is made easier to manufacture the intake manifold because the two parts can be cast individually.

According to another aspect of the present invention, the downstream intake passages are shaped in the form of inverted letter U, and have one ends which are connected to the intake ports of the engine and another ends which are connected to the intake manifold at positions which are offset with respect to the center of the crank shaft towards the cylinder bank opposite to the corresponding intake ports. Optionally, passages which define a part of the downstream intake passages extend from the intake chamber of the second part of the intake manifold along the vertical direction. Thus, the overall passage length of the intake manifold system is increased while the whole system is advantageously accommodated within the gap between the two cylinder banks of the engine.

According to a certain aspect of the present invention, the mating surface between the first part and the second part of the intake manifold is coplanar with the mating surfaces between the downstream intake passages and the intake ports of the engine. Thus, the work involved in assembly of the intake manifold system is simplified.

According to yet another aspect of the present invention, the bottom wall of the intake chamber is convex downward. Thus, the rigidity of the intake chamber is enhanced and the resonance noises in the intake manifold system can be reduced.

According to yet another aspect of the present invention, the bottom wall of the intake chamber is integrally provided with a conduit for conducting the cooling water of the engine therethrough so that evaporation of fuel can be promoted on one hand and to prevent any accumulation of moisture in the intake chamber can be prevented.

According to yet another aspect of the present invention, an EGR gas supply port opens at an downstream end of the upstream intake passages and is directed to a central part of the cross section of the intake chamber. And, the EGR gas port comprises a tubular member which extends a certain distance towards the intake chamber and an axial center line of the tubular member aligns with a central axial line of the intake chamber.

Thus, the EGR gas, which is introduced into the intake chamber from the EGR supply port which is provided in the downstream end of the upstream intake passage, would not adhere to the throttle valve and the surrounding wall surfaces. Additionally, the distribution of the EGR gas to the different cylinders can be made uniform.

BRIEF DESCRIPTION OF THE DRAWINGS

The present invention will now be shown and described in the following in terms of concrete embodiments thereof with reference to the appended drawings, in which:

FIG. 6 is a view corresponding to part of FIG. 3 showing an alternative embodiment of the EGR gas supply port according to the present invention.

DETAILED DESCRIPTION OF THE PREFERRED EMBODIMENTS

Now preferred embodiments of the present invention are described in the following with reference to the appended drawings.

Figure 1:
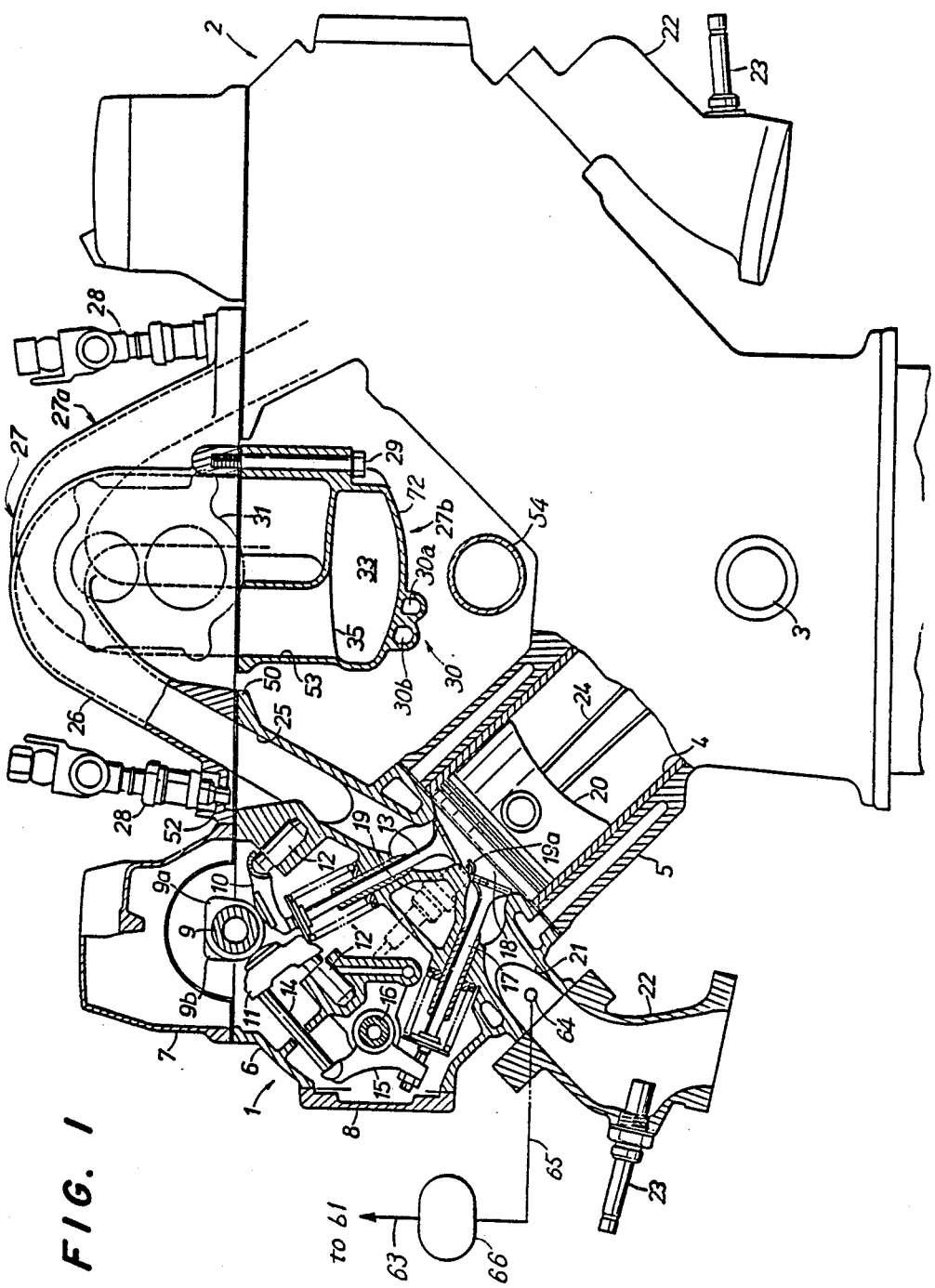
FIG. 1 is a partially broken away front view of an embodiment of an engine to which the intake manifold system of the present invention is applied.

FIG. 1 shows a V-type 4-valve 6-cylinder engine to which the intake manifold system of the present invention is applied, and its cylinder block 5 defines a pair of cylinder banks 1 and 2 of an identical structure which are arranged in the shape of letter "V" forming the bank angle of 90 degrees therebetween and are each internally incorporated with three cylinders 4 along the axial direction of a crank shaft 3. A pair of cylinder heads 6 are fixedly secured to the top ends of the cylinder banks 1 and 2. Each of the cylinder heads 6 is provided with a pair of opening on its top surface and on its external side surface, respectively, which are closed by a cam cover 7 and a rocker arm cover 8, respectively.

A cam shaft 9, which is connected to the crank shaft 3 by way of timing pulleys and an endless timing belt which are not shown in the drawings, is rotatably supported inside the cam cover 7 and cams 9a and 9b which are provided on the cam shaft 9 along its axial direction are engaged to rocker arms 10 and 11.

One of the rocker arms 10 is pivoted by a spherical head of a rocker adjuster 12 at its fulcrum so as to be permitted of a rocking motion and the working end of the rocker arm 10 engages an end of an intake valve 13 which is spring biased towards a closed position. The other rocker arm 11 is pivoted by another rocker adjuster 12' in the same manner as the mentioned rocker arm 10 and its rocking motion is transmitted to an end of a third rocker arm 15 by way of a push rod 14. The third rocker arm 15 is permitted to undergo a see-saw motion by means of a rocker shaft 16 and the other end of the rocker arm 15 engages an end of an exhaust valve 17 which is likewise spring biased towards a closed position.

Thus, the valves 13 and 17 are driven at predetermined timing as the cam shaft 9 rotates in synchronization with the crank shaft 3 to conduct the intake of air/fuel mixture and the exhaust of the burned gas in and out of the cylinder 4 for each stroke of each cycle. The engine to which the present embodiment is applied has four valves or a pair of intake valves and a pair of exhaust valves for each cylinder but only one of the intake valves and one of the exhaust valves are illustrated in FIG. 1.

A spark plug 19 is threaded in the cylinder head 6 at a location corresponding to the substantially central part of each of the cylinders 4, and its electrodes 19a protrude into a combustion chamber 18 defined between the upper end surface of a piston 20 which is slidably received in the cylinder 4 and the cylinder head 6.

An exhaust manifold 22 is attached to the end surface of exhaust ports 21 for each of the cylinder banks 1 and 2 to the end of conducting the combustion gas to the atmosphere by way of a muffler which is not shown in the drawings. An $O_2$ sensor 23 is threaded into the exhaust manifold 22 so as to control the amount of fuel injection according to the amount of intake air to achieve a theoretical air fuel ratio by feeding back the information on the oxygen concentration in the exhaust gas to a controller which is not shown in the drawings.

The piston 20 is connected to the crank shaft 3 by way of a connecting rod 24 so as to convert the reciprocating motion of the piston 20 owing to the combustion pressure of the fuel into the rotational motion of the crank shaft 3.

Figure 2:
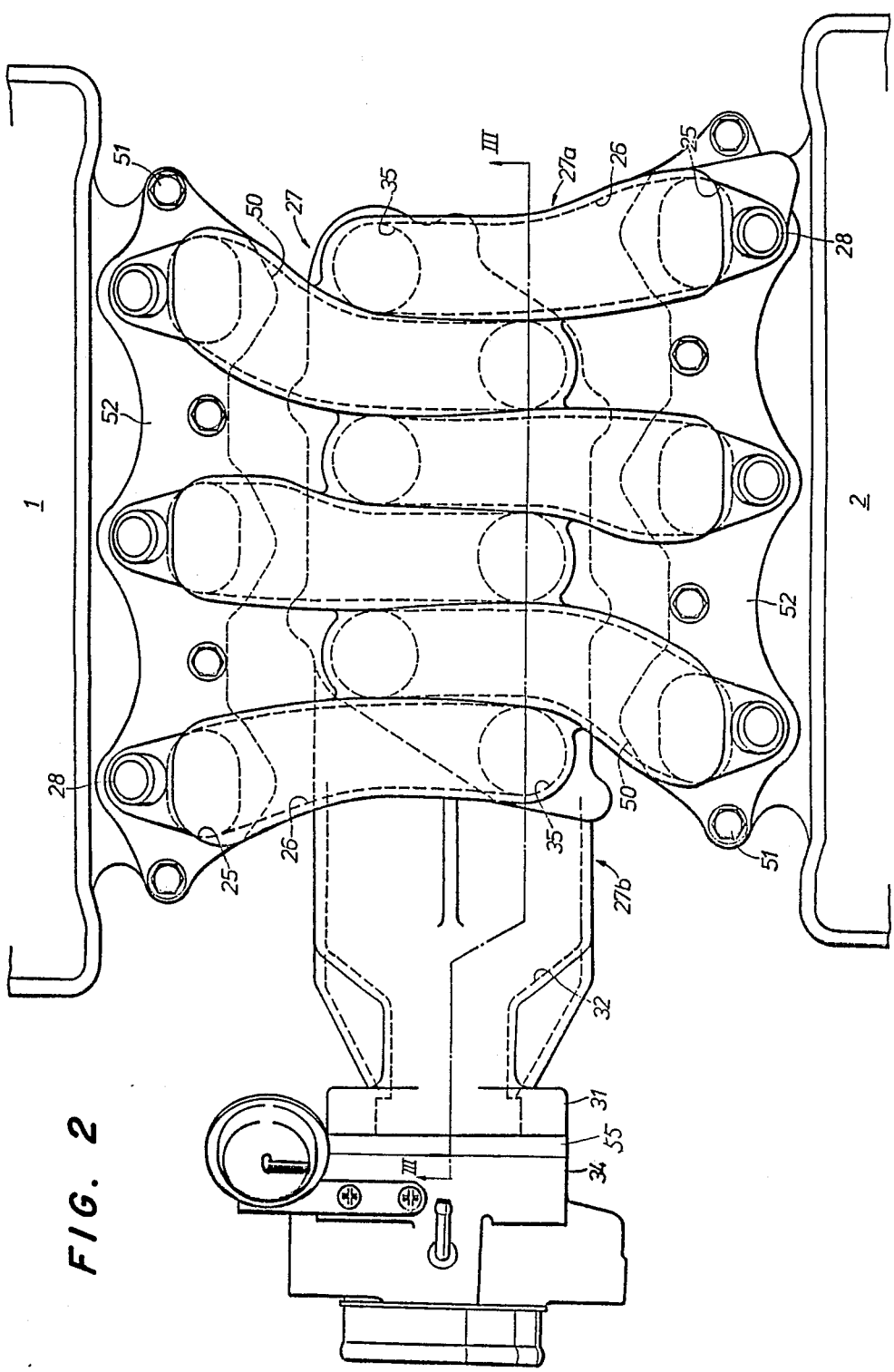
FIG. 2 is a plan view of an essential part of FIG. 1.

The upper surface of the cylinder head 6 and the upper surface of a flange 50 at which the intake ports 25 open are coplanar to each other and a manifold body 27 which integrally defines intake passages 26 corresponding to the intake ports 25 is attached to the upper surface of the flange 50 by means of threaded bolts 51 which are inserted from above (FIG. 2). For each of the cylinders 4, a fuel injection nozzle 28 is attached to a flange 52 of the manifold body 27 located adjacent to the part at which the intake passages 26 and the intake ports 25 are connected to each other so as to inject fuel into the intake port 25.

Figure 3:
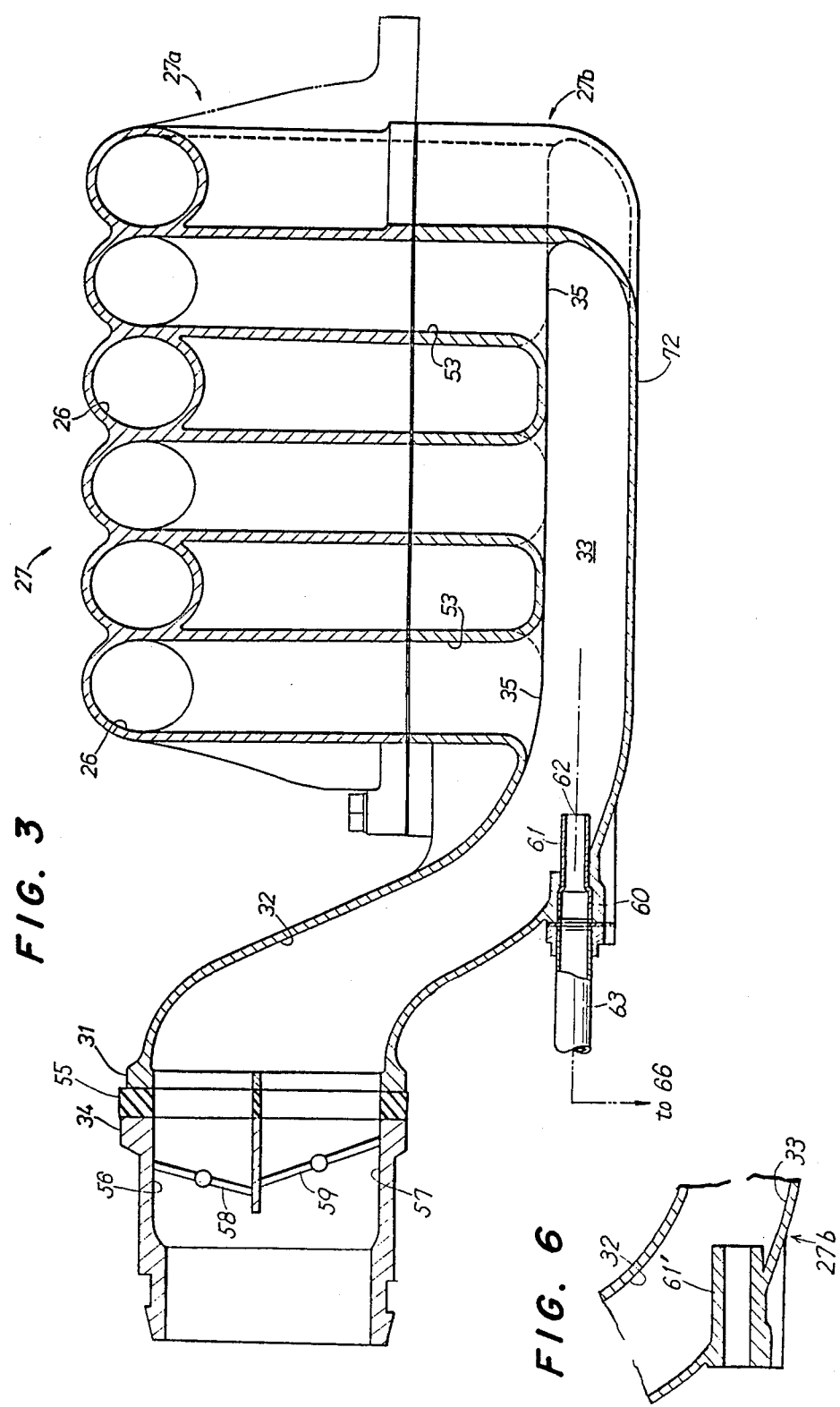
FIG. 3 is a sectional view taken along line III—III of FIG. 3.

As shown in FIGS. 1 to 3, the manifold body 27 is a hollow body which consists of an upper part 27a and a lower part 27b which are integrally connected to each other by threaded bolts 29 which are inserted from below (FIG. 1), and these two parts 27a and 27b are formed by being cast individually.

The upper part 27a defines downstream intake passages 26 which are connected to the intake ports 25 at their downstream ends and extend in the shape of inverted letter U. The upstream ends of the downstream intake passages 26 reach the other sides of the central axial line of the engine as seen in the plan view of FIG. 2 and extend vertically at the extreme upstream ends. Therefore, the downstream portions of the downstream intake passages 26 extend individually to the various intake ports 25 while the upstream portions of the downstream intake passages 26 are interdigitally clustered into a single body.

The lower part 27b of the manifold body 27 defines an intake chamber 33 which has a substantially flat elliptic cross section (FIG. 5) and extends axially substantially over the whole length of the engine. The upper end of the intake chamber 33 are provided with six openings 35 which are arranged in a staggered manner on the alternating sides of the central axial line of the engine as seen in the plan view of FIG. 2 and are individually connected to the corresponding upstream ends of the downstream intake passages 26 by way of six short and linear conduits 53 which are formed integrally with the intake chamber 33 so as to extend vertically therefrom. Thus, the upper part of the intake chamber 33, the openings 5 and the conduits 3 define an intake manifold.

One of the axial ends of the intake chamber 33 is connected to an upstream intake passage 32 which extends obliquely upward from the intake chamber 33 in the manner of a goose neck. The upper end or the upstream end of the upstream intake passage 32, which opens in the axial direction of the engine, is formed into a flange 31 which is connected to a throttle body 34 by way of a rubber gasket 55.

Thus, the overall intake passage of this engine consists of the upstream intake passage 32 which extends obliquely downwards from the throttle body 34, the intake chamber 33, and the downstream intake passages 26 which extend in the shape of inverted letter U and are connected to the individual intake ports 25 of the engine. Therefore, the overall length of the overall intake passage is substantial. Furthermore, as can be seen from the drawings, the intake passage 32 defines a substantial volume in combination with the intake chamber 33, and they in combination define a plenum chamber of a substantial volume. These two factors can contribute to the performance of the engine through improved breathing properties thereof. Additionally, through advantageous arrangement of the overall intake passage as described above, the curvatures of the intake passage are made relatively small the performance of the engine in high speed range is not substantially impaired in spite of the length of the intake passage.

The mating surface between the upper part 27a and the lower part 27b of the manifold body 27 and the mating surface between the lower surface of the flange 52 of the upper part 27a and the upper surface of the flange 50 on the side of the intake ports 25 are coplanar to each other, and the upper part 27a is attached to the engine at the downstream end of the intake passages 26 while the lower part 27b depends from the upper part 27a. This structure is advantageous for the facility of manufacture. Furthermore, since there is a clearance between the lower end of the lower part 27b and the upper surface of the engine between the two cylinder banks 1 and 2, an accessory member such as a conduit 54 for conducting engine cooling water from one axial end of the engine to the other can be accommodated in this clearance.

Figure 4:
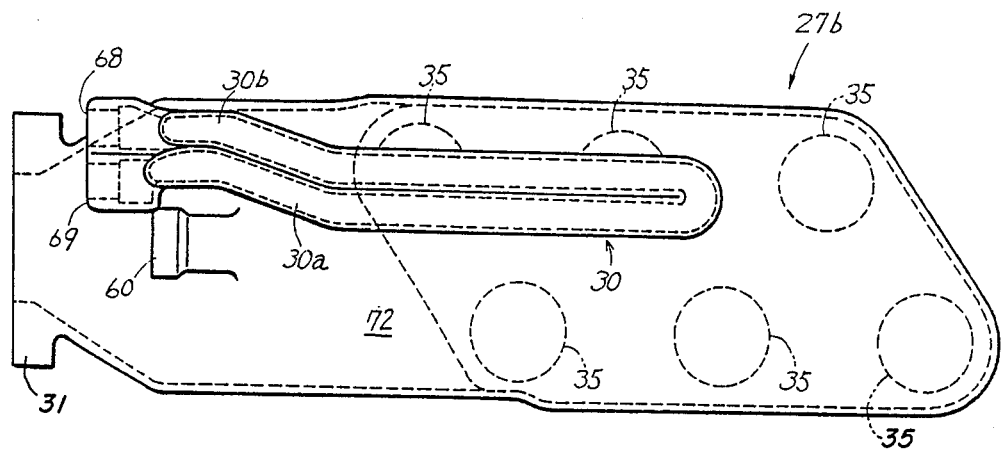
FIGS. 4 and 5 are a bottom view and a front view of the lower part of the intake manifold body.
Figure 5:
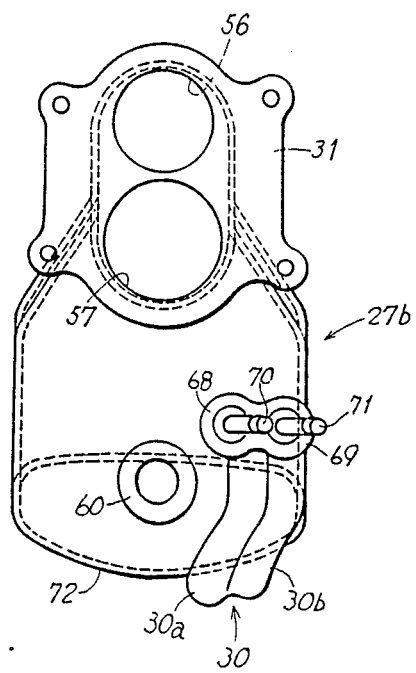

The bottom wall 72 of the intake chamber 33 is convex downwards and can increase the effective volume of the intake chamber 33 on one hand and increase the rigidity of the manifold body 27 on the other hand. A conduit 30 is integrally formed with the bottom wall 72 of the intake chamber 33 for conducting engine cooling water therethrough. This conduit 30 comprises an inlet 68 and an outlet 69 which are formed adjacent to each other and fitted with tubes 70 and 71, and a pair of passages 30a and 30b which extend parallel to each other and are connected to each other at their other ends so as to define a single passage for warming the bottom wall 72 of the intake chamber 33 with the cooling water passed through this conduit 30, as best shown in FIGS. 4 and 5. By thus heating the bottom wall 72 of the intake chamber 33, the temperature of the intake air can be advantageously controlled on one hand and any moisture which may otherwise accumulate in the intake chamber 33 can be eliminated.

The external wall surface of a bend in the downstream end of the upstream intake passage 32 is provided with an annular boss 60 which is pressure fitted with an EGR supply port 61 made of a stainless steel tube. The supply port 61 protrudes into a central portion of the cross section of the downstream end of the upstream intake passage 32 and the opening 62 of the supply port 61 is directed to a central portion of the cross section of the intake chamber 33.

The supply port 61 is connected to an exhaust gas recycling passage 63 of a conventional EGR circuit and this exhaust gas recycling passage 63 communicates with an EGR gas introduction port 64 which opens into the exhaust port 21, by way of an EGR valve 66 and a conduit 65. Therefore, when the engine is operating, part of the exhaust gas flowing through the exhaust port 21 is introduced into the EGR valve 66 by way of the EGR gas introduction port 64 and the conduit 65 and, after being flow rate controlled by the EGR valve 66, is introduced into the central portion of the upstream intake passage 32 by way of the exhaust gas recycling passage 63 and the supply port 61.

The throttle body 34 which is connected to the upstream end of the upstream intake passage 32 is provided with a primary bore 56 and a secondary bore 57 in a mutually parallel relationship one over the other. The primary and secondary bore 56 and 57 are provided with a primary throttle valve 58 and a secondary throttle valve 59, respectively, which are controlled according to the operating condition of the engine. For instance, only the primary throttle valve 58 is opened when the rotational speed of the engine is low and the engine load is light, and both the primary and the secondary throttle valve 58 and 59 are opened when the rotational speed of the engine is high and the engine load is heavy.

Now the action of the EGR system of this embodiment is described in the following.

As the engine is operated, part of the exhaust gas flowing through the exhaust port 21 is taken from the EGR gas introduction port 64 and, after being flow rate controlled by the EGR valve 66, is ultimately introduced into the downstream end of the upstream intake passage 32 by way of the exhaust gas recycling passage 63 and the supply port 61. In this connection, since the linear supply port 61 for the EGR gas extends to the central portion of the cross section of the downstream end of the upstream intake passage 32 where the speed of the intake air is highest and its opening 62 is directed to the central portion of the cross section of the intake chamber 33, the EGR gas which issues from the linear supply port 61 mixes well with the central body of the intake air which flows through the upstream intake passage 32 and, by virtue of the inertia effect of the linear supply port 61, vigorously flows towards the central portion of the intake chamber 33 with the result that the intake air evenly flows to the six distribution conduits 53 of the intake chamber 33 and is therefrom distributed to the various cylinders of the first and the second cylinder banks 1 and 2 by way of the six downstream intake passages 26 of the manifold body 27. And, even when the secondary throttle valve 58 is closed and some negative pressure has been produced in the vicinity of the secondary throttle valve 59 for instance when the rotational speed of the engine is low and the engine load is light, the EGR gas which issues from the supply port 61 is not blown back to the throttle body 34 thereby eliminating the possibility of lead oxide or the like contained in the exhaust gas adhering to the throttle valves 58 and 59 and the surrounding wall surfaces and preventing these throttle valves 58 and 59 from sticking.

According to the present embodiment, since the supply port 61 of the EGR gas is made of a stainless steel tube, the part of the supply port 61 which protrudes into the upstream intake passage 32 can be given with a small diameter and the distribution of the EGR gas can be made substantially uniform so as to eliminate the possibility of any ill effect arising from uneven distribution of the EGR gas which may otherwise affect the performance of the engine.

FIG. 6 shows a modified embodiment of the present invention. According to the present modified embodiment, the supply port 61' for the EGR gas is integrally formed with the intake chamber 8 and this can contribute to the reduction of manufacturing cost.

Thus, according to the present invention, since a relatively complex passage structure can be obtained without making the manufacture thereof unduly difficult and a required passage length can be obtained while accommodating the overall structure in a compact space, the present invention is highly effective in reducing the size of the engine and improving its performance.

Additionally, by advantageous arrangement of the EGR system, the EGR gas can be released to the central portion of the intake chamber where the speed of the air flow is highest for uniform mixing with the intake air, and, therefore, even when some negative pressure has been produced in the vicinity of the throttle body the EGR gas will not be blown back to the throttle valve area with the result that lead oxide or the like contained in the exhaust gas will not adhere to the throttle valves and the inner wall surfaces of the throttle body and the overall performance of the engine can be improved.

What we claim is:

1. An intake manifold system, comprising an upstream intake passage communicating with a main throttle valve located upstream thereof, an intake chamber communicating with the downstream end of the upstream intake passage, an intake manifold communicating with the downstream end of the intake chamber, and a plurality of downstream intake passages which are connected between the downstream ends of the intake manifold and intake ports of the engine in communication therewith, in a gap defined between two cylinder banks of a V-type multiple cylinder engine, wherein:

the intake chamber extends along the direction of the crank shaft of the engine as a hollow chamber which is integrally formed with the intake manifold, and the upstream intake passage, which is connected between the throttle body and the intake chamber, inclines upward from its intake chamber end to its throttle body end;

an EGR gas supply port opens at a downstream end of the upstream intake passage and is directed to a central part of the cross section of the intake chamber, said EGR gas port includes a tubular member which extends a certain distance into the downstream end of the upstream intake passage and aligns with a central axial line of the intake chamber.

2. An intake manifold system for V-type multiple cylinder engine as defined in claim 1, wherein the intake manifold system comprises of a first part having the downstream intake passages integrally therewith and a second part having the intake chamber and the upstream intake passage integrally therewith and depending from the first part.

3. An intake manifold system for V-type multiple cylinder engine as defined in claim 2, wherein the downstream intake passages extend in the shape of inverted letter U, and have one ends which are connected to the intake ports of the engine and another ends which are connected to the intake manifold at positions which are offset with respect to the center of the crank shaft towards the cylinder bank opposite to the corresponding intake ports.

4. An intake manifold system for V-type multiple cylinder engine as defined in claim 3, wherein the mating surface between the first part and the second part of the intake manifold is coplanar with the mating surfaces between the downstream intake passages and the intake ports of the engine.

5. An intake manifold system for V-type multiple cylinder engine as defined in claim 4, wherein the intake manifold comprises passages which define a part of the downstream intake passages and extend from the intake chamber of the second part of the intake manifold along the vertical direction.

6. An intake manifold system for V-type multiple cylinder engine as defined in claim 5, wherein the bottom wall of the intake chamber is convex downwards.

7. An intake manifold system for V-type multiple cylinder engine as defined in claim 6, wherein the bottom wall of the intake chamber is integrally provided with a conduit for conducting the cooling water of the engine therethrough.

* * * * *